US007404504B2

(12) United States Patent
Settelmayer

(10) Patent No.: US 7,404,504 B2
(45) Date of Patent: Jul. 29, 2008

(54) ADJUSTABLE REAR-MOUNTED CARGO CARRIERS

(75) Inventor: Joseph J. Settelmayer, Fieldbrook, CA (US)

(73) Assignee: Yakima Products, Inc., Beaverton, OR (US)

( * ) Notice: Subject to any disclaimer, the term of this patent is extended or adjusted under 35 U.S.C. 154(b) by 0 days.

(21) Appl. No.: 11/202,953

(22) Filed: Aug. 12, 2005

(65) Prior Publication Data

US 2006/0032880 A1    Feb. 16, 2006

Related U.S. Application Data

(60) Provisional application No. 60/601,509, filed on Aug. 12, 2004.

(51) Int. Cl.
*B60R 9/00*    (2006.01)

(52) U.S. Cl. .................. 224/497; 224/502; 224/314; 224/924

(58) Field of Classification Search ............. 224/497, 224/495, 500, 502, 504, 505, 507, 924, 314, 224/324
See application file for complete search history.

(56) References Cited

U.S. PATENT DOCUMENTS

| 4,830,250 | A | * | 5/1989 | Newbold et al. | ............. 224/314 |
| 5,056,700 | A | * | 10/1991 | Blackburn et al. | ........... 224/324 |
| 5,495,970 | A | * | 3/1996 | Pedrini | ..................... 224/314 |
| 6,422,443 | B1 | * | 7/2002 | Erickson et al. | ............. 224/924 |
| 6,467,664 | B2 | * | 10/2002 | Robins et al. | ............... 224/924 |
| 2002/0117524 | A1 | * | 8/2002 | Jeong | .................... 224/314 |

* cited by examiner

*Primary Examiner*—Nathan J. Newhouse
*Assistant Examiner*—Margaret Olson
(74) *Attorney, Agent, or Firm*—Kolisch Hartwell, P.C.

(57) ABSTRACT

Cargo carriers are disclosed, and more particularly adjustable cargo carriers that may be mounted on a rear of a vehicle.

38 Claims, 5 Drawing Sheets

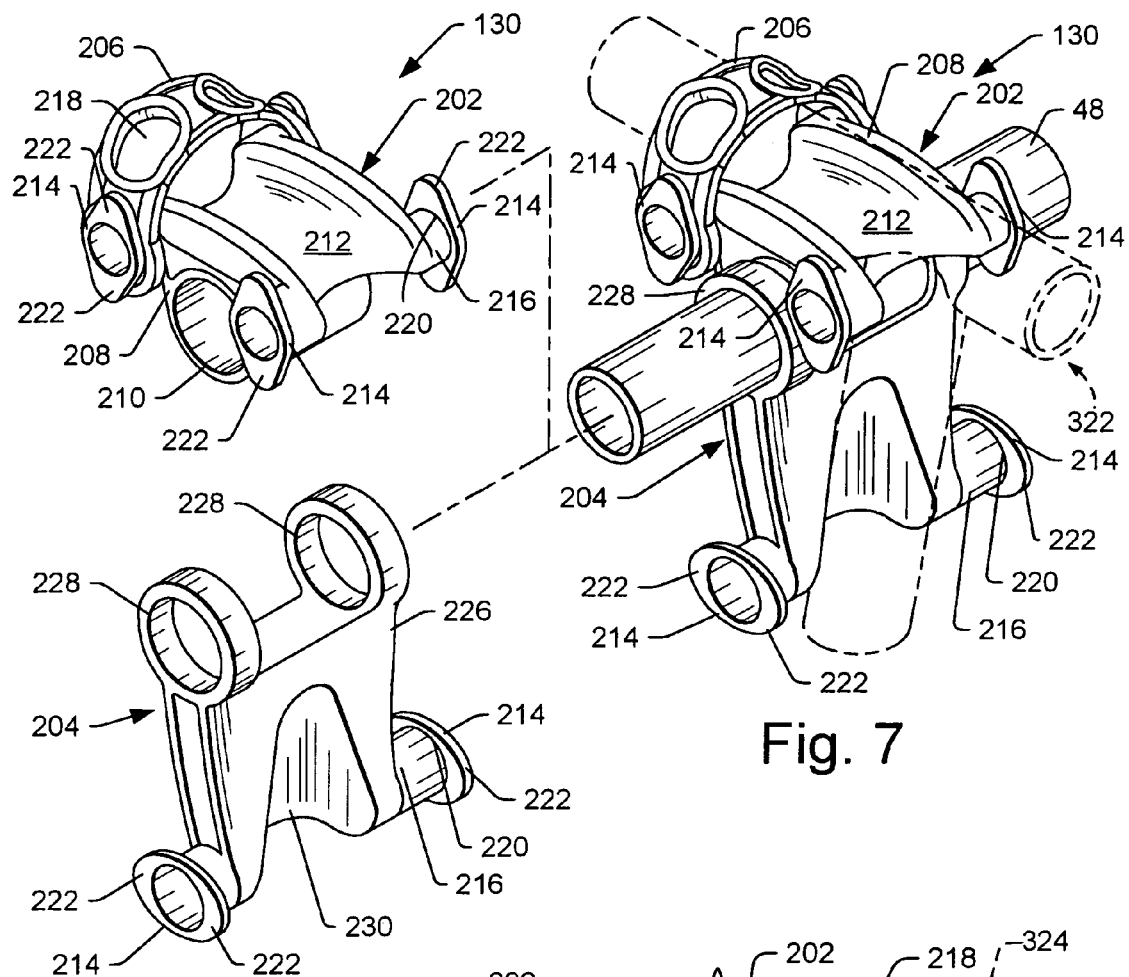
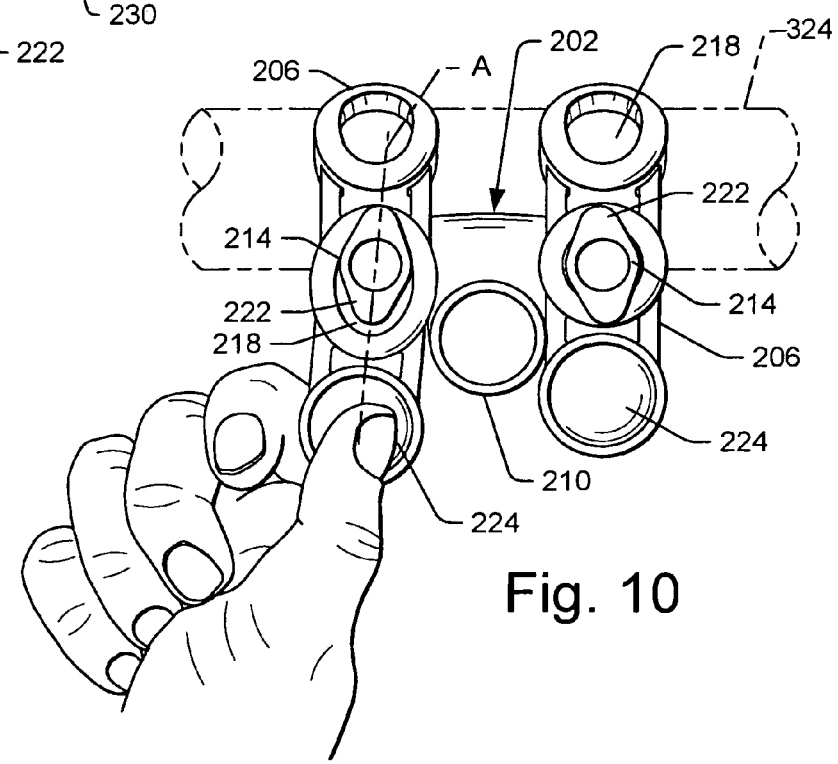
Fig. 7
Fig. 10

ADJUSTABLE REAR-MOUNTED CARGO CARRIERS

CROSS-REFERENCE TO RELATED APPLICATIONS

This application claims priority under 35 U.S.C. § 119(e) to U.S. Provisional Patent Application Ser. No. 60/601,509 entitled "Rear-Mounted Bicycle Carrier with Multi-Hub Assemblies," filed Aug. 12, 2004. The complete disclosure of that application is hereby incorporated by reference for all purposes.

BACKGROUND OF THE DISCLOSURE

The popularity of recreational cycling has grown substantially in recent years. As a result, the demand for cargo carriers to transport bikes and other types of cargo items on cars and other vehicles also has grown. There are various types of vehicle-mounted cargo carriers available. One type is mountable on the trunk or other rear portion of a vehicle to carry one or more cargo items adjacent the rear of the vehicle. While some rear-mounted carriers are adjustable, the adjustment mechanisms are cumbersome or do not provide sufficient adjustability to mount those carriers on different vehicles and/or to support different cargo items.

SUMMARY OF THE DISCLOSURE

Some embodiments provide a cargo carrier configured to be mounted to a rear of a vehicle. The cargo carrier includes first, second, and third support frame structures, where one of the support frame structures is configured to contact an upper portion of the rear of the vehicle, where a second one of the support frame structures is configured to contact a lower portion of the rear of the vehicle, and where a third one of the support frame structures is configured to support at least one cargo item; and at least one hub assembly operatively connecting the first, second, and third support frame structures and permitting selective pivoting of two of the support frame structures relative to a third of the support frame structures. The at least one hub assembly includes first and second locking devices, the first locking device is configured to lock relative movement between the first and second support frame structures, and the second locking device is configured to lock relative movement between the second and third support frame structures.

BRIEF DESCRIPTION OF THE DRAWINGS

FIG. 7 is an isometric view showing a cradle and a stabilizer installed on a support arm and engaging a portion of a bicycle frame (shown in dashed lines).

FIG. 10 is a rear elevation of a cradle showing a strap engaged one an anchor, and another strap being stretched to disengage another anchor.

DETAILED DESCRIPTION OF THE DISCLOSURE

Figure 1:
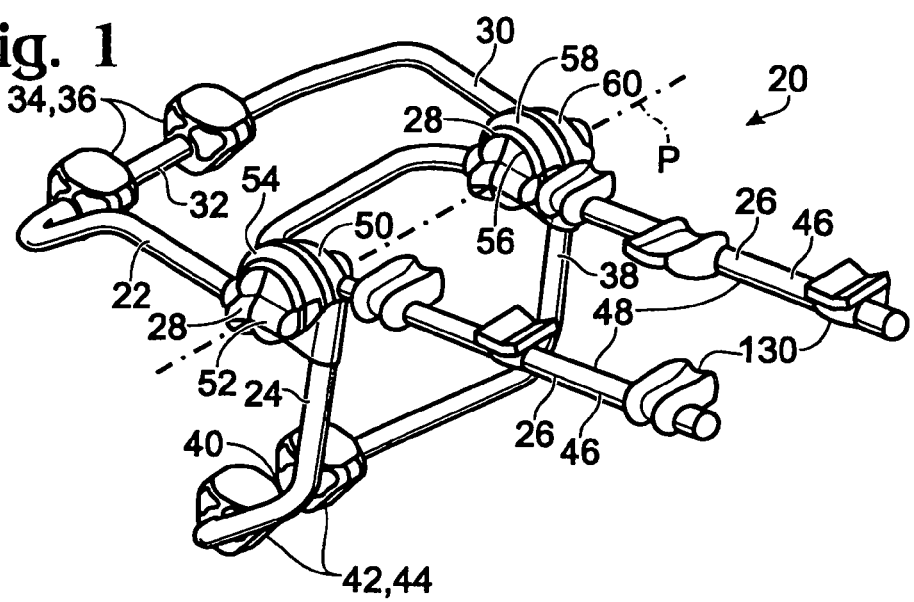
FIG. 1 is an isometric view of an adjustable cargo carrier.
Figure 2:
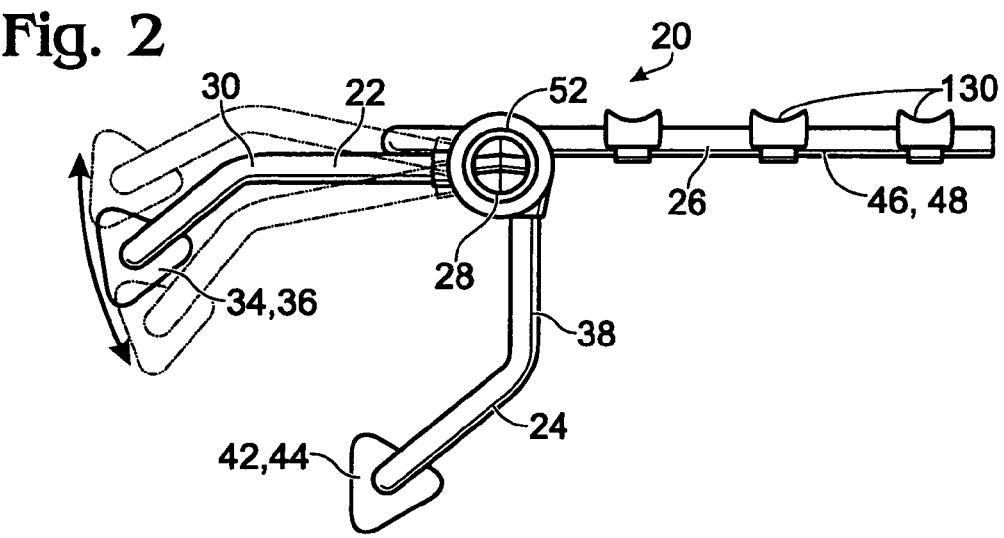
FIG. 2 is a side view of the adjustable cargo carrier of FIG. 1 illustrating adjustability of the cargo carrier.
Figure 3:
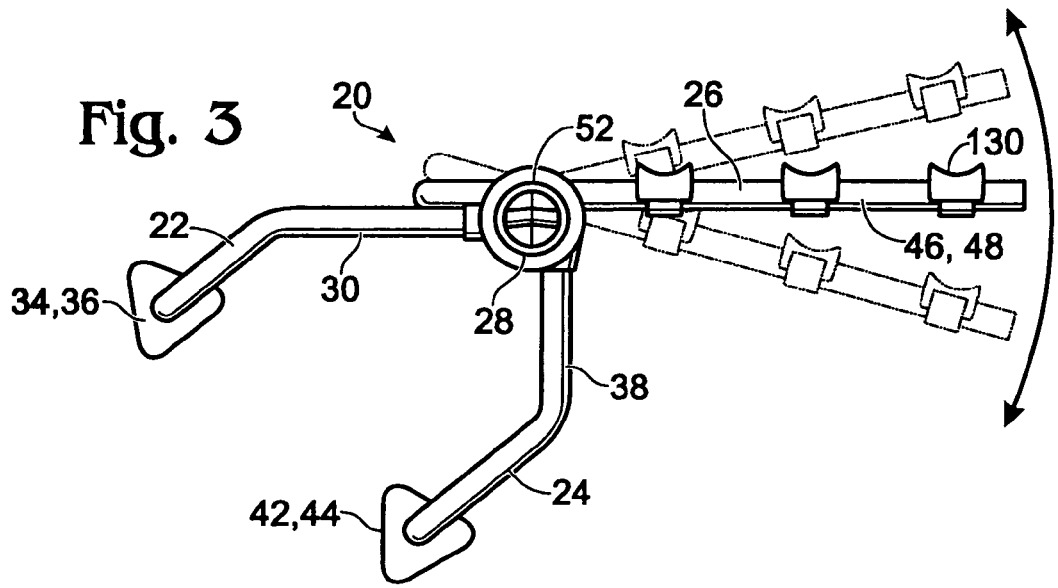
FIG. 3 is a side view of the cargo carrier of FIG. 1 illustrating adjustability of the cargo carrier.

FIGS. 1-3 depict some embodiments of a cargo carrier 20. Cargo carrier 20 may include any suitable structure configured to be mounted to a rear of a vehicle and support one or more cargo items, such as one or more bicycles. For example, cargo carrier 20 may include a first support structure 22, a second support structure 24, a third support structure 26, and at least one hub assembly 28.

First support structure 22 may include any suitable structure configured to be mounted to and/or contact an upper portion of the rear of the vehicle. For example, first support structure 22 may include a first support frame structure 30. The first support frame structure may include a base portion 32 and one or more cushioning elements 34. The base portion may include any suitable structure configured to contact an upper portion of the rear of the vehicle. The cushioning elements may include any suitable structure configured to protect the vehicle and/or the first support frame structure from scratching and/or other damage. For example, cushioning elements 34 may include pads 36.

Second support structure 24 may include any suitable structure configured to be mounted to and/or contact a lower portion of the rear of the vehicle. For example, second support structure 24 may include a second support frame structure 38. The second support frame structure may include a base portion 40 and one or more. cushioning elements 42. The base portion may include any suitable structure configured to contact a lower portion of the rear of the vehicle. The cushioning elements may include any suitable structure configured to protect the vehicle and/or the second support frame structure from scratching and/or other damage. For example, cushioning elements 42 may include pads 44.

Although cushioning elements 34 and 42 are shown to include pads 36 and 44, any suitable structure configured to protect the vehicle and/or the first or second support structures from damage may be used. Additionally, although first and second support frame structures 30 and 38 are shown to include a specific form and/or shape, those support frame structures may include any suitable form and/or shape configured to be mounted to the rear of the vehicle. For example, the first and second support frame structures may include stabilizing structures as disclosed in U.S. patent application Ser. No. 111198,891 entitled "Rear-Mounted Bicycle Carrier with Stabilizing Structures," filed Aug. 4, 2005, the complete disclosure of which is hereby incorporated by reference for all purposes. Moreover, although first and second support structures 22 and 24 are shown to be configured to be mounted to and/or contact upper and lower portions of a rear of a vehicle, the first and second support structures may be configured to be mounted to and/or contact any suitable portion(s) of a rear or other area(s) of a vehicle.

Third support structure 26 may include any suitable structure configured to support one or more cargo items, such as one or more bicycles. For example, the third support structure may include a third support frame structure 46. The third support frame structure may include support or carrier arms 48. The support arms may be configured in any suitable way or form. For example, the support arms may be at least substantially rectilinear. Additionally, or alternatively, support arms 48 may be perpendicular to a pivot axis along which the first, second, and/or third support structure pivots via the at least one hub assembly, as further discussed below. Moreover, the support arms may be parallel to each other and/or may be incorporated with first support structure 22.

Although support arms 48 are shown as a pair of support arms in the specific configuration in FIGS. 1-3, the support arms may be configured in any suitable way or form configured to support one or more cargo items, such as one or more bicycles. For example, more or less support arms may be provided. Additionally, or alternatively, the support arms may be curvilinear, may be non-parallel, and/or may be incorporated with first support structure 22 or second support structure 24. Moreover, although third support structure 26 is shown to be independent of first and second support structures 22 and 24, the third support structure may be incorporated or formed with one or both of those structures. Furthermore, although the first, second, and third support structures are shown to be configured for certain portions of the rear of the vehicle and to support cargo items, those support structures may be interchanged in any suitable way.

At least one hub assembly 28 may include any suitable structure operatively connecting the first, second, and/or third support structures. The hub assembly also may include any suitable structure configured to permit selective pivoting of one or more of the first, second, and third support structures along a pivot axis P relative to the other structures, and/or to secure or lock relative movement among the support structures. At least one hub assembly 28 may include an inner portion 50, an outer portion 52, and an intermediate portion 54 disposed between the inner and outer portions, as shown in FIG. 1.

The terms "operatively connecting," "operatively connected," and "operative connection," as used herein, include direct and/or indirect connections configured to allow movement of one or more structures relative to other structure(s). The movement allowed by the operative connection may include one or more of pivoting, rotating, sliding, etc.

Figure 4:
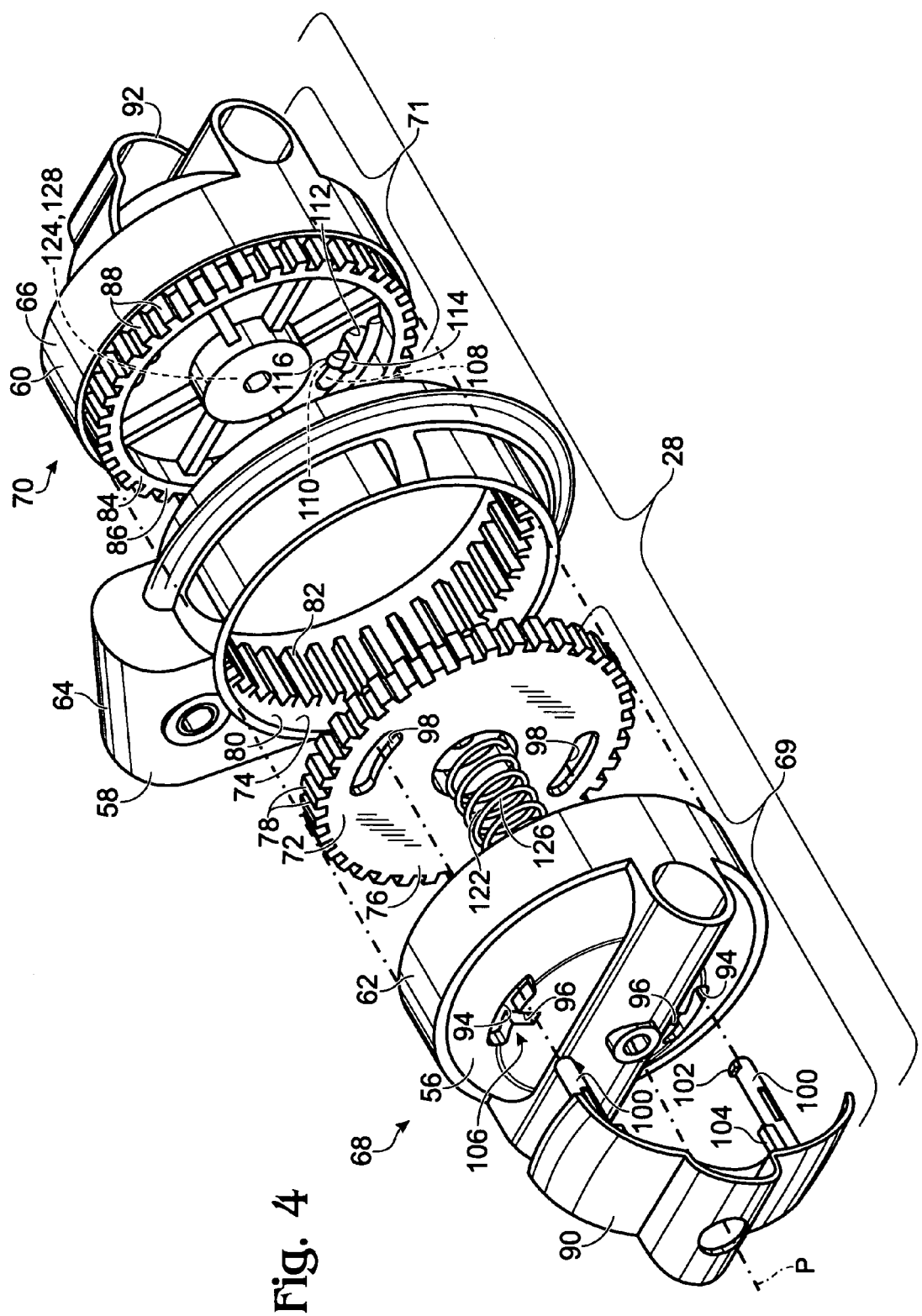
FIG. 4 is an exploded isometric view of a hub assembly of the cargo carrier of FIG. 1.
Figure 5:
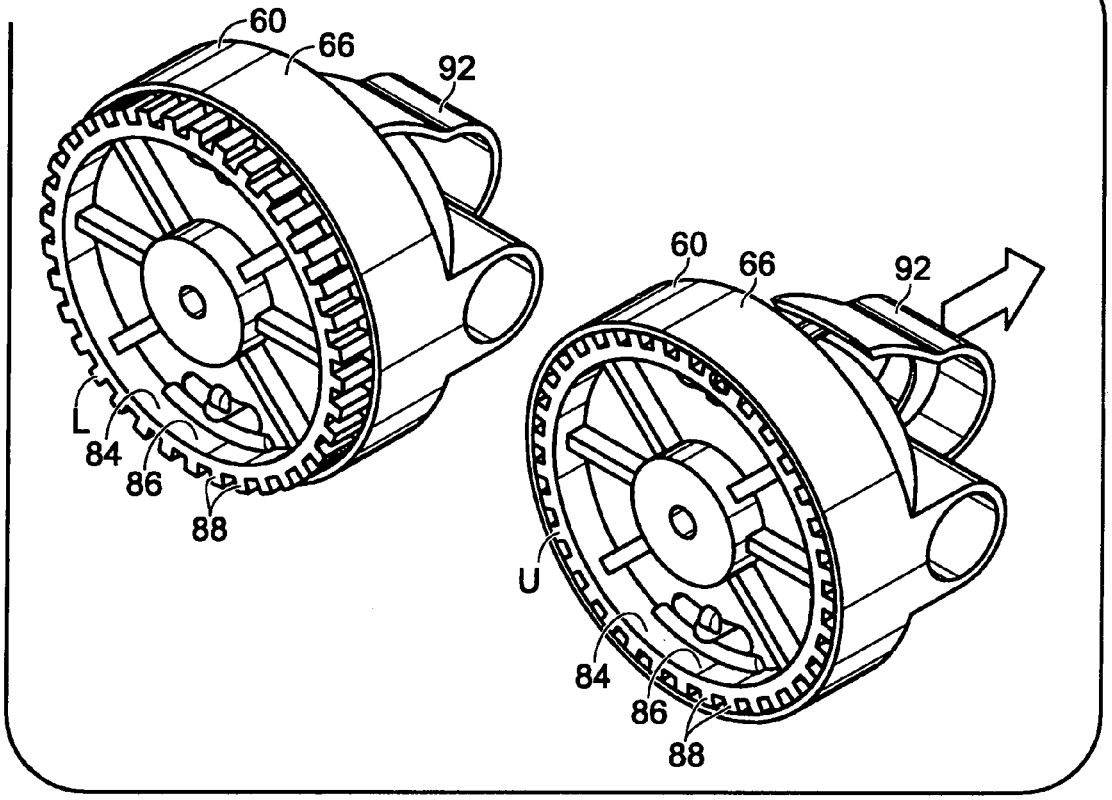
FIG. 5 is a partial isometric view of the hub assembly of the cargo carrier of FIG. 1 showing a handle and a locking element in the locking and unlocking positions.
Figure 6:
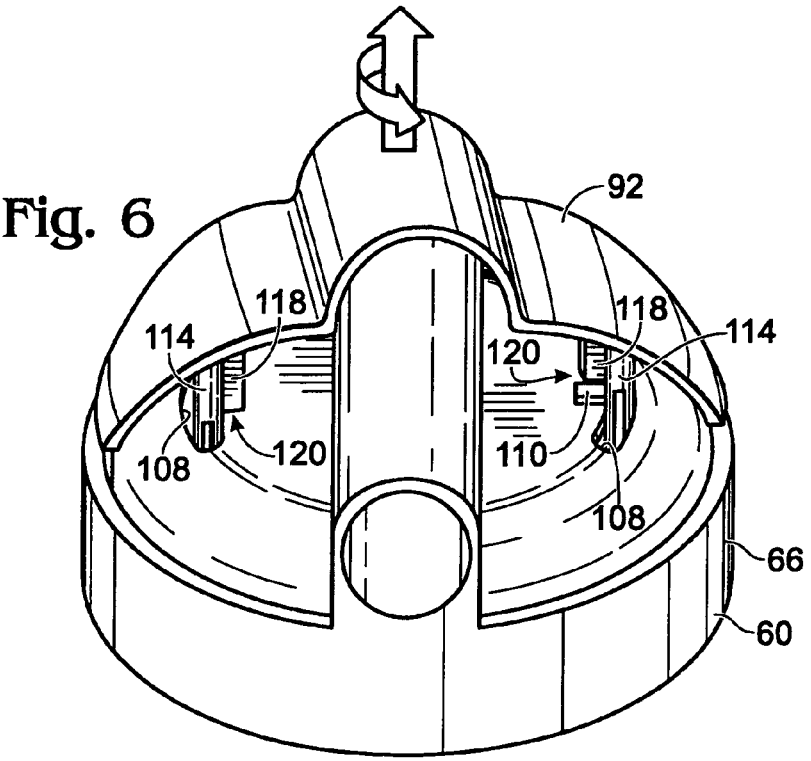
FIG. 6 is a partial isometric view of the hub assembly showing the handle engaging a portion of a connector element to secure the locking element in the unlocking position.

The hub assembly may include a first connector element 56, a second connector element 58, and a third connector element 60, as shown in FIGS. 4-6. The first connector element may include any suitable structure configured to operatively connect the first support structure to the second and/or third support structures. For example, first connector element 56 is shown to include a first hub 62 attached to the first support structure and configured to pivot about pivot axis P relative to the second and/or third connector elements. The first hub may be in any suitable location of the hub assembly. For example, the first hub may be at least substantially contained within outer portion 52 of the hub assembly.

The second connector element may include any suitable structure configured to operatively connect the second support structure to the first and/or third support structures. Additionally, the second connector element may be configured to at least partially contain other elements of the hub assembly. For example, second connector element 58 may include a frame 64 attached to the second support structure and at least partially contain the first and third connector elements. The second connector element may pivot the second support structure about pivot axis P relative to the first and/or third connector elements. The frame may be in any suitable location of the hub assembly. For example, the frame may be at least substantially contained within intermediate portion 54 of the hub assembly.

The third connector element may include any suitable structure configured to operatively connect the third support structure to the first and/or second support structures. For example, third connector element 60 may include second hub 66 attached to the third support structure and configured to pivot about pivot axis P relative to the first and/or second connector elements. The second hub may be in any suitable location of the hub assembly. For example, the second hub may be at least substantially contained within inner portion 50 of the hub assembly.

Although the first, second, and third connector elements are shown to be configured to pivot the first, second, and third support structures about pivot axis P, those connector elements may be configured to pivot about any suitable axis or axes. Additionally, although the first, second, and third connector elements are shown to be at least substantially contained within the outer, intermediate, and inner portions of the hub assembly, respectively, those connector elements may be in any suitable portions of the hub assembly. For example, the first connector element may be at least substantially contained within the intermediate and/or the inner portions of the hub assembly.

Moreover, although the first, second, and third connector elements are shown to include the first and second hubs and the frame, any suitable structure configured to operatively connect the first, second, and/or third support structures may be used. Furthermore, although the first, second, and third support structures are shown to be pivotally connected, one or more of those structures may be connected to the hub assembly in any suitable way, such as sliding connections, etc.

At least one hub assembly 28 also may include a first locking device 68 and a second locking device 70, as shown in FIG. 4. First locking device 68 and first connector element 56 may be referred to as a first pivoting connector assembly 69. Second locking device 70 and third connector element 60 may be referred to as a second pivoting connector assembly 71.

The first locking device may include any suitable structure configured to secure and/or lock relative movement between the first and second support structures. For example, first locking device 68 may include a first locking element 72 and a second locking element 74. The first locking element may be supported via the first connector element. For example, the first locking element may be operatively connected to, connected to, and/or incorporated with the first connector element.

Second locking element 74 may be supported via the second connector element. For example, the second locking element may be operatively connected to, connected to, and/or incorporated with the second connector element. Additionally, first locking element 72 may be configured to move between a locking position L in which the first locking element may engage the second locking element to lock relative movement between the first and second support structures, and an unlocking position U in which the first locking element may disengage or may be spaced from the second locking element to allow relative movement between the first and second support structures.

The first and second locking elements may include any suitable structure configured to engage each other to lock relative movement between the first and second support structures. For example, the first locking element may include a locking wheel 76 slidingly connected to the first connector element such that the locking wheel moves between the locking and unlocking positions. The locking wheel may include one or more teeth 78. Additionally, the second locking element may include a cavity 80 having one or more teeth 82. The teeth of the locking wheel may be configured to engage the teeth of the cavity when the first locking element is in locking position L, and the teeth of the locking wheel may not engage or may be spaced from the teeth of the cavity when the first locking element is in unlocking position U.

Although the first and second locking elements are shown to include the locking wheel having teeth and the cavity having teeth, respectively, the first locking element may include the cavity and the second locking element may include the locking wheel. Additionally, although the locking wheel and the cavity are shown to have teeth distributed around the circumference of each, the teeth may be distributed in any suitable manner. For example, fewer teeth may be provided in the locking wheel and/or the cavity to limit the number of positions that the first locking device may lock relative movement between the first and second support structures.

Moreover, although the first and second locking elements are shown to be circular in shape, those locking elements may be any suitable shape. Furthermore, although the first and second locking elements are shown to include the locking wheel and the cavity, those locking elements may include any suitable structure configured to engage each other to lock relative movement between the first and second support structures.

Additionally, although first locking element 72 is shown to be operatively connected to first connector element 56 and second locking element 74 is shown to be incorporated with the second connector element 58, the first and second locking elements may be supported via the first and second connector elements in any suitable way. For example, the second locking element may be operatively connected to the second connector element in addition to, or instead of, the first locking element being operatively connected to the first connector element.

The second locking device may include any suitable structure configured to secure and/or lock relative movement between the second and third support structures. For example, second locking device 70 may include second locking element 74 and a third locking element 84. As discussed above, second locking element 74 may be supported via the second connector element, such as being operatively connected to, connected to, and/or incorporated with the second connector element.

The third locking element may be supported via the third connector element. For example, the third locking element may be operatively connected to, connected to, and/or incorporated with the third connector element. Additionally, third locking element 84 may be configured to move between a locking position L in which the third locking element may engage the second locking element to lock relative movement between the second and third support structures, and an unlocking position U in which the third locking element may disengage or may be spaced from the second locking element to allow relative movement between the second and third support structures, as shown in FIG. 5. Although only the third locking element is illustrated in FIG. 5 to move between the locking and unlocking positions, the first locking element discussed above may at least similarly move between the locking and unlocking positions.

The second and third locking elements may include any suitable structure configured to engage each other to lock relative movement between the first second and third support structures. For example, the second locking element may include cavity 80 having one or more teeth 82. Additionally, the third locking element may include a locking wheel 86 slidingly connected to the third connector element such that the locking wheel moves between the locking and unlocking positions. The locking wheel may include one or more teeth 88. The teeth of the locking wheel may be configured to engage the teeth of the cavity when the third locking element is in locking position L, and the teeth of the locking wheel may not engage or may be spaced from the teeth of the cavity when the third locking element is in unlocking position U.

Although the second and third locking elements are shown to include the cavity having teeth and the locking wheel having teeth, respectively, the second locking element may include the locking wheel and the third locking element may include the cavity. Additionally, although the locking wheel and the cavity are shown to have teeth distributed around the circumference of each, the teeth may be distributed in any suitable manner. For example, fewer teeth may be provided in the locking wheel and/or the cavity to limit the number of positions that the second locking device may lock relative movement between the second and third support structures.

Moreover, although the second and third locking elements are shown to be circular in shape, those locking elements may be any suitable shape. Furthermore, although the second and third locking elements are shown to include the cavity and the locking wheel, those locking elements may include any suitable structure configured to engage each other to lock relative movement between the second and third support structures. Additionally, although the first and second locking devices both include or share second locking element 74, those locking devices may include mutually exclusive or non-shared locking elements.

Furthermore, although second locking element 74 is shown to be incorporated with second connector element 58 and third locking element 84 is shown to be operatively connected to third connector element 60, the second and third locking elements may be supported via the second and third connector elements in any suitable way. For example, the second locking element may be operatively connected to the second connector element in addition to, or instead of, the third locking element being operatively connected to the first connector element.

For ease of manufacturing, several components of the at least one hub assembly may be at least substantially similar in form and/or in dimension. For example, the first and second locking devices may be made of components of at least substantially similar forms and/or dimensions, such as at least substantially similar locking elements, handles, etc. Additionally, or alternatively, the first and third connector elements may be of at least substantially similar forms and/or dimensions.

The first and second locking devices may include first and second handles 90 and 92, as shown in FIGS. 4-6. The first handle may include any suitable structure configured to move the first locking element between the locking and unlocking positions and/or to secure the first locking element in the locking or unlocking position. The first locking element and the first connector element also may include any suitable structure configured to allow the first handle to move the first locking element between the locking and unlocking positions.

For example, as shown in FIG. 4, first connector element 56 may include one or more slots 94 having one or more notches 96, and locking wheel 76 of first locking element 72 may include one or more slots 98. The first handle may include one or more end portions 100, which are configured to fit within slots 94 and 98. The end portions also may include one or more lips 102, which may be configured to abut against and/or grip one or more edges of slots 98, which may allow the first handle to move locking wheel 76 between the locking and unlocking positions.

The end portions of the first handle and the slots of the first connector element also may allow the first handle to secure the first locking element in the unlocking or locking position. For example, as shown in FIG. 4, end portions 100 may include one or more ledges 104 configured to fit within notches 96 of slots 94. The ledges of the end portions may be configured to be selectively engageable with one or more portions 106 of the first connector element to secure the first locking element in the unlocking position (against the urging of a bias element in some embodiments).

A user may secure the first locking element in the unlocking position by moving that locking element to the unlocking position and then moving the first handle such that ledges 104 engages the portions 106 of the first connector element. For example, the user may pull the first handle to move the first locking element to the unlocking position, and then twist that handle to make one or more of ledges 104 engage portions 106. To move the first locking element to the locking position, the first handle may be moved to disengage the ledges from the portions of the first connector element and then moved to the locking position. For example, the user may twist the first handle and then release that handle.

The second handle may include any suitable structure configured to move the third locking element between the locking and unlocking positions and/or to secure the third locking element in the locking or unlocking position. The third locking element and the second connector element also may include any suitable structure configured to allow the second handle to move the third locking element between the locking and unlocking positions.

For example, as shown in FIG. 4, third connector element 60 may include one or more slots 108 having one or more notches 110, and locking wheel 86 of third locking element 84 may include one or more slots 112. The second handle may include one or more end portions 104, which are configured to fit within slots 108 and 112. The end portions also may include one or more lips 106, which may be configured to abut against and/or grip one or more edges of slots 112, which may allow the second handle to move locking wheel 86 between the locking and unlocking positions.

The end portions of the second handle and the slots of the third connector element also may allow the second handle to secure the third locking element in the unlocking or locking position. For example, end portions 114 may include one or more ledges 118 configured to fit within notches 110 of slots 108. The ledges of the end portions may be configured to be selectively engageable with one or more portions 120 of the third connector element to secure the third locking element in the unlocking position (against the urging of a bias element in some embodiments), as shown in FIG. 6. Although only the ledges of the second handle engaging one or more portions 120 of the third connector element is illustrated in FIG. 6, the ledges of the first handle discussed above may at least similarly engage one or more portions 106 of the first connector element.

A user may secure the third locking element in the unlocking position by moving that locking element to the unlocking position and then moving the second handle such that ledges 118 engages the portions 120 of the third connector element. For example, the user may pull the second handle to move the third locking element to the unlocking position, and then twist that handle to make one or more of ledges 118 engage portions 120. To move the third locking element to the locking position, the second handle may be moved to disengage the ledges from the portions of the third connector element and then moved to the locking position. For example, the user may twist the first handle and then release that handle.

Although the first and second handles are shown to be attached to the first and third locking elements via slots and end portions, those handles may be attached to the first and third locking elements in any suitable way. Additionally, although the first and second handles are shown to be mostly external the first and third connector elements and span at least a substantial portion of the length of those connector elements, the first and second handles may be in any suitable location and may be any suitable size.

Moreover, although the first and second handles are shown to secure the first and third locking elements in the unlocking position, those handles (and the corresponding locking elements and connector elements) may be configured to secure the first and/or third locking elements in the locking position. Furthermore, although the first and second handles, the first and third connector elements, and the first and third locking elements include specific structure to allow the first and second handles to secure those locking elements in the unlocking or locking position, any suitable structure may be used.

Additionally, first and second locking devices 68 and 70 may include bias elements 122 and 124, as shown in FIG. 4. Bias element 122 may include any suitable structure configured to urge first locking element 72 towards the locking and/or unlocking positions. For example, bias element 122 may include spring 126, which may be configured to urge the first locking element towards the locking position. Bias element 124 may include any suitable structure configured to urge third locking element 84 towards the locking and/or unlocking positions. For example, bias element 124 may include spring 128, which may be configured to urge the third locking element towards the locking position.

Although only bias element 122 is illustrated in FIG. 4, bias element 124 may be provided to urge third locking element towards the locking and/or unlocking position. Additionally, although bias elements 122 and 124 are shown to include springs 126 and 128, any suitable bias element may be used configured to urge the first and third locking element towards the locking and/or unlocking positions. Moreover, although the bias elements are shown to be configured to urge the first and third locking element towards the locking positions, those bias elements may additionally, or alternatively, be configured to urge the first and/or third locking elements towards the unlocking position.

At least one hub assembly 28 may include additional components not shown, such as suitable fastening elements (e.g., bolts, nuts, etc.), gripping elements, and/or labels. Although the hub assembly is shown to include connector elements and locking devices, the hub assembly may include any suitable structure configured to operatively connect the first, second, and/or third support structures, to permit selective pivoting of one or more of the first, second, and third support structures along a pivot axis P relative to the other structures, and/or to secure and/or lock relative movement among the support structures.

Turning attention now to FIGS. 7-10, cargo carrier 20 also may include one or more mounting assemblies 130, which may include any suitable structure configured to secure one or more cargo items to support arms 48. Each mounting assembly may comprise different components depending on the types of cargo item supported, arrangement of the carrier of the rear of the vehicle, and/or any other suitable factors. For example, when cargo carrier 20 is used to carry one or more bicycles, mounting assemblies 130 may include a cradle 202, a stabilizer 204, and one or more tie-down members (or straps) 206. It will be appreciated, however, that some or all of the mounting assemblies may omit one or more of these components. As one example, a particular mounting assembly may omit a stabilizer and include only a cradle and tie-down member. As another example, the cradle and/or the stabilizer may be configured to grip a bicycle without the need for a tie-down member.

Figure 8:
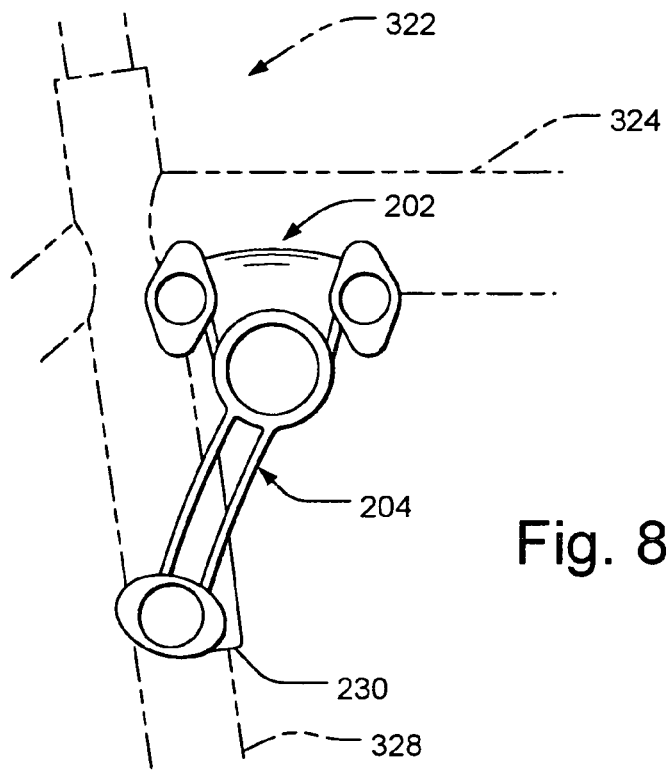
FIG. 8 is a rear elevation of a cradle and a stabilizer showing how the cradle supports a top tube of a bicycle frame, and showing the stabilizer positioned to engage a seat tube of the bicycle frame.
Figure 9:
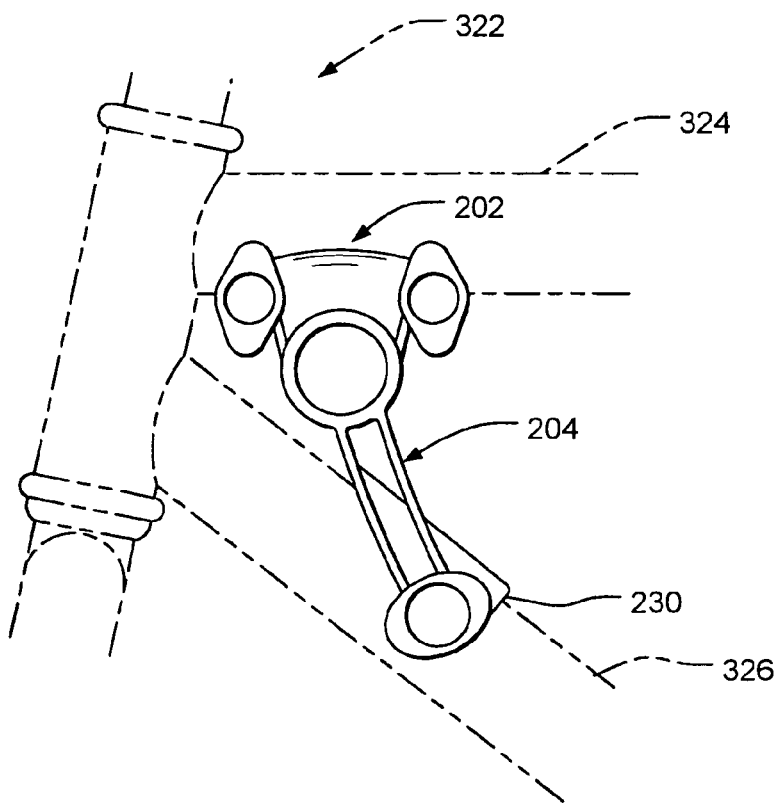
FIG. 9 is a rear elevation of a cradle and a stabilizer showing how a top tube of a bicycle frame is supported by the cradle, and showing the stabilizer positioned to engage the down tube of the bicycle frame.

As is well known in the art, bicycles typically include a frame 322 having a top tube 324, a down tube 326, and a seat tube 328, as shown in FIGS. 8-9. Top tube 324 may extend generally forwardly and horizontally from proximate the bicycle seat to proximate the handle bars. Down tube 326 may be coupled to the top tube proximate the handle bars and extends downwardly and rearwardly toward the pedal sprocket. Seat tube 328 may be coupled to the top tube proximate the seat and extends generally downwardly to the pedal sprocket.

Cradle 202 is disposed on support arm 48 to receive and engage a portion of top tube 324 and to retain the bike in a selected longitudinal position on the support arm. As shown in FIG. 1, cradles may be disposed on both support arms and aligned to receive the top tube of a single bike. Thus, the bike may be supported above the ground and retained in a stable position behind the vehicle during travel. The cradle may include a unitary body 208 formed of molded Santoprene rubber or other suitable material adapted to grip the bike frame without causing scratches or other damage.

Body 208 may be formed to define a cylindrical collar 210 adapted to fit over and engage support arm 48, and a channel 212 extending into the body. To install a cradle on a support arm, the user may slide the collar along the support arm to the desired location, and then may rotate the cradle until the channel is aligned in the desired orientation. Typically, channel 212 is oriented above the support arm to allow the top tube of the bicycle to rest in the channel. Channel 212 may be formed as an elongate, parabolic trough adapted to accept top tube 324. The channel may be oriented in a direction generally transverse to collar 210 so that the channel extends generally across the support arms when installed on the rack.

As shown in the illustrative example, the sides of channel 212 may be sized to extend partially up the sides of a top tube resting in the channel. Alternatively, the sides of channel 212 may be larger or smaller as desired. In any event, channel 212 may grip top tube 324 and may retain the bicycle in a stable longitudinal position along the support arm during operation of the vehicle.

To prevent top tube 324 from being dislodged accidentally, one or more tie-down members 206 may be positioned over the top tube and fastened to cradle 202. As shown in the illustrative example, each cradle may include one or more anchors 214 extending from body 208. Anchor 214 may include a circular base 216 that is sized to fit within circular apertures 218 formed in tie-down member 206. Each anchor may have a distal end 220 spaced from body 208, and one or more flanges 222 arranged about the distal end. Flanges 222 may be arranged generally along a single transverse axis A to form an oval or elongate rim. Flanges 222 may prevent the tie down members from slipping off circular base 216. Tie-down members 206 may be made of a stretchable material (e.g. Dynaflex G7431 rubber), and may be stretched along axis A to allow the apertures to pass over the flanges. Thus, the tie-downs member may not accidentally become disengaged from the anchors unless the tie-down members are stretched to clear the flanges.

Referring to the tie-down member on the left in FIG. 10, a user may secure the tie-down member to an anchor by hooking one edge of a selected aperture around one flange, and then pulling the tie-down member directly away from the hooked flange (i.e., along axis A). When the tie-down member is pulled along axis A, it will stretch along axis A causing the selected aperture to stretch over the opposite flange. Once the aperture clears the opposite flange, the user may press the tie-down member inward over the flange, and then may release the tie-down member to return to its unstretched condition, illustrated by the tie-down member on the right in FIG. 10. Tie-down member 206 may include a handle or tab 224 to allow the user to grip the tie-down member more easily. The user may disengage the tie-down member by reversing the above steps. In some embodiments, the tie-down members may be formed of a different, more flexible material than the cradles to prevent the anchors from bending when a tie-down member is being stretched over the flanges.

As shown in the illustrative example, each cradle 202 may include two pairs of anchors 214, with one pair disposed adjacent opposite sides of one end of channel 212, and the other pair disposed adjacent opposite sides of the other end of channel 212. Nevertheless, it will be appreciated that other configurations are also within the scope of the invention. For example, a cradle may include less than or more than two pairs of anchors. In addition, it may not be necessary to engage a tie-down member to both pairs of anchors to hold the top tube within the saddle. Similarly, while tie-down members 206 are described above as being separate and removable from cradles 202, an alternative embodiment of the invention may include tie-down members that are formed integrally with the cradles. For example, one end of the tie-down member may extend from adjacent one side of channel 212, and be positionable over top tube 324 to engage an anchor disposed adjacent the opposite side of channel 212. Furthermore, while bases 216 and apertures 218 have been described and depicted as generally circular, it will be appreciated that these parts may be any suitable shape.

While cradles 202 may be configured to retain a bike in a selected longitudinal position on the support arm, it will be appreciated that the bike may tend to swing or sway due to the motion of the vehicle. To protect both the vehicle and bike(s) from damage due to swinging, mounting assembly 130 also may include one or more stabilizers 204 to impede swinging of the bicycle. Each stabilizer may include an integrally formed body 226 with a pair of collars 228 configured to fit over the support arm. As can be seen in FIG. 7, collars 228 may be spaced apart to fit on either side of collar 210 of the cradle when the cradle and stabilizer are mounted together on the support arm. Collars 228 may allow the stabilizer to slide along, and pivot about, the support arm. Because stabilizer 204 is separate from cradle 202, the stabilizer may pivot about the support arm independently of the cradle. While both collars 210 and 228 may be configured to fit on support arm 48 tightly enough to prevent the mounting assembly from accidentally sliding off, the support arm also may include a removable cap (not shown) on the end of the support arm to prevent passage of the collars.

Body 226 may be formed to define a channel 230 extending at least partially into the body, and may be constructed of any suitable material including nylon. The stabilizer may be installed on the support arm so that the channel faces out to the side of the vehicle. The channel may be configured to receive at least a portion of either down tube 326 or seat tube 328. The pivoting connection of stabilizer 204 with support arm 48 may allow the user to selectively position the stabilizer to engage either the seat tube, as shown in FIG. 8, or the down tube, as shown in FIG. 9. When the seat tube or the down tube is received into channel 230, the sides of the channel may prevent lateral swinging of the bicycle frame.

It will be appreciated that stabilizer 204 may provide greater stabilizing moment if it engages either the seat tube or the down tube at a location spaced from the top tube. Thus, in the illustrative example, body 226 is approximately four inches long from the top of collars 228 to the bottom of channel 230, and engages the seat tube or the down tube at a location substantially spaced from the top tube of the bicycle. It will be appreciated, however, that the stabilizers may be formed either longer or shorter within the scope of the invention.

Stabilizer 204 also may include one or more anchors 214 configured to engage and secure one or more tie-down members. As shown in the illustrated example, the anchors on the stabilizers may be substantially similar to the anchors on the cradles so that tie-down members 206 may be secured interchangeably to either the cradles or the stabilizers. Alternatively, the anchors on the stabilizers may be configured differently than the anchors on the cradles for compatibility with different tie-down members. Furthermore, as described above in connection with the cradles, the stabilizers may include other configurations of anchors and tie-down members within the scope of the invention.

In the illustrative example shown in FIG. 1, carrier 20 includes three pairs of mounting assemblies for mounting three bicycles. Alternatively, carrier 20 may include only one pair of mounting assemblies for holding one bike, two pairs of mounting assemblies for holding two bikes, or four or more pairs for holding four or more bikes. Furthermore, while each mounting assembly is illustrated as including both a cradle and a stabilizer, it will be appreciated that a single stabilizer per bike may be sufficient to prevent the bike from swinging during travel. Indeed, for bikes with top tubes that are substantially longer than the spacing between the support arms, it may be difficult to engage both the seat tube and the down tube with stabilizers. Thus, in an alternative embodiment, a pair of mounting assemblies may include a first assembly having both a cradle and a stabilizer, and a second assembly having only a cradle. Because the stabilizer may be pivoted to engage either the seat tube or the down tube of a bike, the bike may be mounted facing either the left or the right of the vehicle regardless of which support arm the stabilizer is installed on. Indeed, it may be desirable, when carrying two or more bikes, to mount adjacent bikes facing in opposite directions so that the handlebars of the bikes do not collide. This arrangement may allow more bikes to be carried because they could be placed more closely together.

Although mounting assemblies 130 are shown to be configured to secure one or more bicycles to support arms 48, the mounting assemblies may be configured to secure any suitable cargo item(s), such as skis, snowboards, kayaks, storage containers, fisherman's baskets, etc.

Although cargo carriers and features of cargo carriers have been shown and described with reference to the foregoing operational principles and preferred embodiments, those skilled in the art will find apparent that various changes in form and detail may be made without departing from the spirit and scope of the claims. The present disclosure is intended to embrace all such alternatives, modifications, and variances that fall within the scope of the appended claims.

What is claimed is:

1. A cargo carrier configured to be mounted to a rear of a vehicle, comprising:
   first, second, and third support frame structures, wherein one of the support frame structures is configured to contact an upper portion of the rear of the vehicle, wherein a second one of the support frame structures is configured to contact a lower portion of the rear of the vehicle, and wherein a third one of the support frame structures is configured to support at least one cargo item; and
   at least one hub assembly operatively connecting the first, second, and third support frame structures and permitting selective pivoting of the first and third support frame structures relative to the second support frame structure, the at least one hub assembly including:
   a first locking device configured to selectively prevent pivoting of the first support frame structure relative to the second support frame structure,
   a second locking device configured to selectively prevent pivoting of the third support frame structure relative to the second support frame structure,
   a first unlocking structure configured to selectively cause the first locking device to permit the pivoting of the first support frame structure without causing the second locking device to permit the pivoting of the third support frame structure, and
   a second unlocking structure configured to selectively cause the second locking device to permit the pivoting of the third support frame structure without causing the first locking device to permit the pivoting of the first support frame structure.

2. The cargo carrier of claim 1, wherein the first and third support frame structures pivot about a common pivot axis.

3. The cargo carrier of claim 1, wherein the third one of the support frame structures is a U-shaped support structure having first and second support arms in fixed positions relative to each other, and configured to cooperatively support at least one cargo item.

4. The cargo carrier of claim 1, wherein the first locking device is at least substantially contained within an outer portion of the at least one hub assembly.

5. The cargo carrier of claim 4, wherein the second locking device is at least substantially contained within an inner portion of the at least one hub assembly.

6. The cargo carrier of claim 1, wherein the at least one hub assembly includes a first connector element attached to the first support frame structure, a second connector element attached to the second support frame structure, and a third connector element attached to the third support frame structure, and wherein two of the connector elements are configured to permit selective pivoting of the two of the support frame structures relative to the third of the support frame structures.

7. The cargo carrier of claim 6, wherein the first connector element is at least substantially contained within an outer portion of the at least one hub assembly.

8. The cargo carrier of claim 7, wherein the second connector element is at least substantially contained within an intermediate portion of the at least one hub assembly.

9. The cargo carrier of claim 8, wherein the third connector element is at least substantially contained within an inner portion of the at least one hub assembly.

10. The cargo carrier of claim 6, wherein the first locking device includes a first locking element supported via the first connector element, and a second locking element supported via the second connector element, and wherein the first locking element is configured to move between a locking position in which the first locking element engages the second locking element to prevent pivoting of the first support frame structure relative to the second support frame structure and an unlocking position in which the first locking element disengages the second locking element to permit pivoting of the first support frame structure relative to the second support frame structure.

11. The cargo carrier of claim 10, wherein the first locking element includes a plurality of teeth and the second locking element includes a plurality of teeth, and wherein the teeth of the first locking element engage the teeth of the second locking element when the first locking element is in the locking position, and the teeth of the first locking element do not engage the teeth of the second locking element when the first locking element is in the unlocking position.

12. The cargo carrier of claim 11, wherein the second locking device includes the second locking element and a third locking element supported via the third connector element, and wherein the third locking element is configured to move between a locking position in which the third locking element engages the second locking element to prevent pivoting of the third support frame structure relative to the second support frame structure and an unlocking position in which the third locking element disengages the second locking element to permit pivoting of the third support frame structure relative to the second support frame structure, and the third locking element is configured to move between its locking and unlocking positions independently of the first locking element moving between its locking and unlocking positions.

13. The cargo carrier of claim 12, wherein the third locking element includes a plurality of teeth, and wherein the teeth of the third locking element engage the teeth of the second locking element when the third locking element is in the locking position, and the teeth of the third locking element do not engage the teeth of the second locking element when the third locking element is in the unlocking position.

14. The cargo carrier of claim 12, wherein the first unlocking structure includes a first handle configured to selectively move the first locking element between the locking and unlocking positions without moving the third locking element between the locking and unlocking positions.

15. The cargo carrier of claim 14, wherein the first handle is configured to secure the first locking element in the unlocking position.

16. The cargo carrier of claim 15, wherein the first handle is selectively engageable with a portion of the first connector element to secure the first locking element in the unlocking position.

17. The cargo carrier of claim 14, wherein the second unlocking structure includes a second handle configured to selectively move the third locking element between the locking and unlocking positions without moving the first locking element between the locking and unlocking positions.

18. The cargo carrier of claim 17, wherein the second handle is configured to secure the third locking element in the unlocking position.

19. The cargo carrier of claim 18, wherein the second handle is selectively engageable with a portion of the third connector element to secure the third locking element in the unlocking position.

20. The cargo carrier of claim 1, wherein the at least one hub assembly includes inner, intermediate, and outer portions.

21. The cargo carrier of claim 20, wherein the first support frame structure is operatively connected to the outer portion of the at least one hub assembly.

22. The cargo carrier of claim 21, wherein the first support frame structure is configured to contact the upper portion of the rear of the vehicle.

23. The cargo carrier of claim 20, wherein the second support frame structure is operatively connected to the intermediate portion of the at least one hub assembly.

24. The cargo carrier of claim 23, wherein the second support frame structure is configured to contact the lower portion of the rear of the vehicle.

25. The cargo carrier of claim 20, wherein the third support frame structure is operatively connected to the inner portion of the at least one hub assembly.

26. The cargo carrier of claim 25, wherein the third support frame structure is configured to support the at least one cargo item.

27. The cargo carrier of claim 1, wherein the third support frame structure includes at least one mounting assembly configured to secure the at least one cargo item to the third support frame structure.

28. The cargo carrier of claim 27, wherein the at least one cargo item includes at least one bicycle having a top tube, a down tube, and a seat tube, and wherein the at least one mounting assembly includes a cradle for supporting the top tube of the at least one bicycle, and at least one strap attached to the cradle and configured to secure the top tube of the at least one bicycle to the cradle.

29. The cargo carrier of claim 28, wherein the at least one mounting assembly includes a stabilizer pivotally mounted to the third support frame structure, the stabilizer having a channel for engaging at least one of a down tube and a seat tube of the at least one bicycle.

30. The cargo carrier of claim 29, wherein the at least one mounting assembly includes a strap attached to the stabilizer and configured to secure at least one of a down tube and a seat tube to the channel of the stabilizer.

31. A bicycle carrier configured to be mounted to a rear of a vehicle, comprising:
  a first support frame structure configured to contact an upper portion of the rear of the vehicle;
  a second support frame structure configured to contact a lower portion of the rear of the vehicle;
  a third support frame structure configured to support at least one bicycle; and
  at least one hub assembly operatively connecting the first, second, and third support frame structures and permitting selective pivoting of at least the first and third support frame structures relative to the second support frame structure, the at least one hub assembly including a first connector element attached to the first support frame structure and permitting selective pivoting of the first support frame structure relative to the second support frame structure, a second connector element attached to the second support frame structure, and a third connector element attached to the third support frame structure and permitting selective pivoting of the third support frame structure relative to the second support frame structure, the hub assembly including:
    a first locking device at least substantially contained within an outer portion of the at least one hub assembly and configured to selectively prevent pivoting of the first support frame structure relative to the second support frame structure,
    a second locking device at least substantially contained within an inner portion of the hub assembly and configured to selectively prevent pivoting of the third support frame structure relative to the second support frame structure,
    a first unlocking handle configured to selectively cause the first locking device to permit pivoting of the first support frame structure relative to the second support frame structure without causing the second locking device to permit pivoting of the third support frame structure relative to the second support frame structure, and a second unlocking handle configured to selectively cause the second locking device to permit pivoting of the third support frame structure relative to the second support frame structure without causing the first locking device to permit pivoting of the first support frame structure relative to the second support frame structure.

32. The cargo carrier of claim 31, wherein the third support structure is a U-shaped support structure having first and second support arms in fixed positions relative to each other, and configured to cooperatively support at least one bicycle.

33. The cargo carrier of claim 31, wherein the first and third support frame structures pivot about a common pivot axis.

34. The cargo carrier of claim 31, wherein the first locking device includes a first locking element supported via the first connector element, and a second locking element supported via the second connector element, wherein the first locking element is configured to move between a locking position in which the first locking element engages the second locking element to prevent pivoting of the first support frame structure relative to the second support frame structure and an unlocking position in which the first locking element disengages the second locking element to permit pivoting of the first support frame structure relative to the second support frame structure.

35. The cargo carrier of claim 34, wherein the second locking device includes the second locking element and a third locking element supported via the third connector element, and wherein the third locking element is configured to move between a locking position in which the third locking element engages the second locking element to prevent pivoting of the third support frame structure relative to the second support frame structure and an unlocking position in which the third locking element disengages the second locking element to permit pivoting of the third support frame structure relative to the second support frame structure, and the first and third locking elements are independently movable between their respective locking and unlocking positions.

36. The cargo carrier of claim 35, wherein the first unlocking handle is configured to selectively move the first locking element between its locking and unlocking positions, and the second unlocking handle is configured to selectively move the third locking element between its locking and unlocking positions.

37. A cargo carrier configured to be mounted to a rear of a vehicle, comprising:

a first support structure having a first base portion configured to contact an upper portion of the rear of the vehicle;

a second support structure having a second base portion configured to contact a lower portion of the rear of the vehicle;

a third support structure configured to support at least one cargo item; and at least one hub assembly operatively connecting the first support structure, the second support structure, and the third support structure, the at least one hub assembly at least partially containing:

a first pivoting connector assembly connected to one of the first support structure, the second support structure, and the third support structure, wherein the first pivoting connector assembly is configured to secure the one structure in a selected one of a plurality of positions relative to the other structures, a first unlocking handle configured to cause the first pivoting connector assembly to permit the one structure to pivot about a pivot axis among the plurality of positions relative to the other structures, a second pivoting connector assembly connected to one of the other structures and configured to secure the one of the other structures in a selected one of a plurality of positions relative to the support structure connected to the first pivoting connector assembly, and a second unlocking handle configured to cause the second pivoting connector assembly to permit the one of the other structures to pivot about the pivot axis among the plurality of positions relative to the support structure connected to the first pivoting connector assembly without causing the first pivoting connector assembly to permit the one structure to pivot about the pivot axis among the plurality of positions relative to the other structures.

38. The cargo carrier of claim 37, wherein the third support frame structure is a U-shaped support structure having first and second support arms in fixed positions relative to each other, and configured to cooperatively support at least one cargo item.

* * * * *